Jan. 23, 1923.
J. M. SMITH ET AL.
SAFETY LOCKING ATTACHMENT.
FILED JULY 28, 1922.
1,443,285
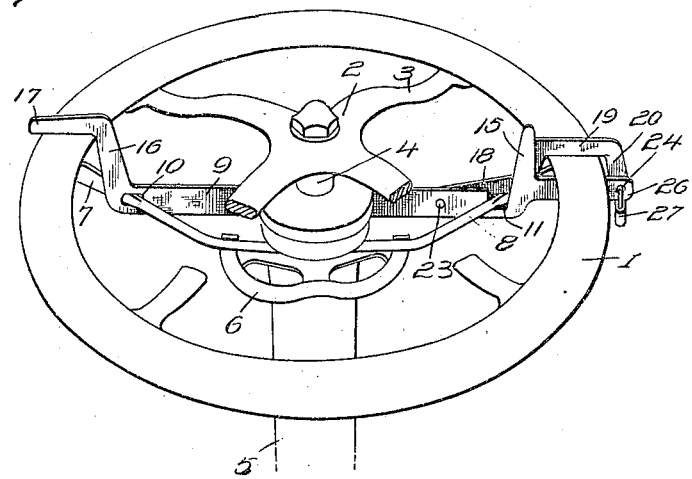
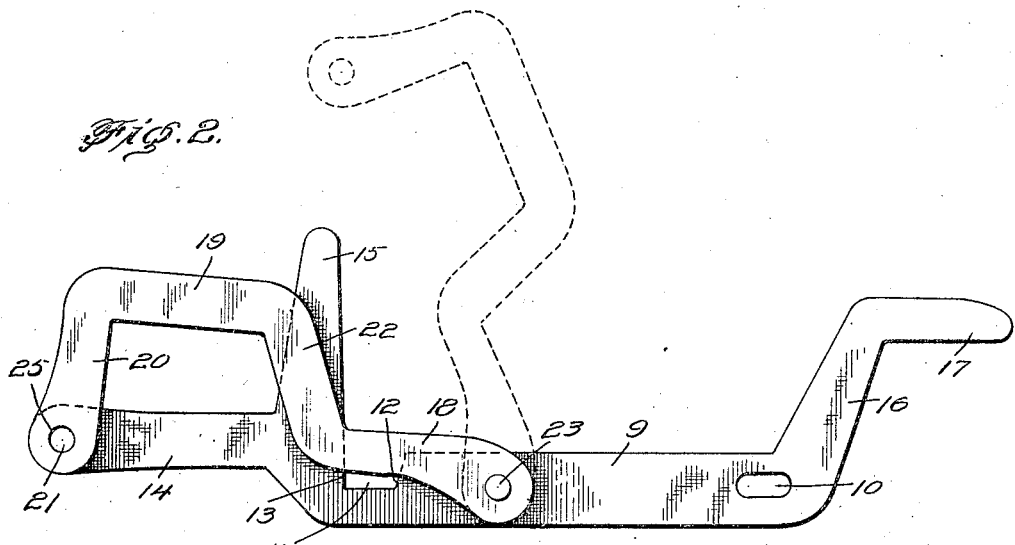
INVENTOR.
Earnest Schanks and Justin M. Smith.
BY
Geo. F. Kimmel
ATTORNEY.

Patented Jan. 23, 1923.

1,443,285

UNITED STATES PATENT OFFICE.

JUSTIN M. SMITH AND EARNEST SCHANKS, OF BILLINGS, MONTANA.

SAFETY LOCKING ATTACHMENT.

Application filed July 28, 1922. Serial No. 578,197.

*To all whom it may concern:*

Be it known that we, JUSTIN M. SMITH and EARNEST SCHANKS, citizens of the United States, residing at Billings, in the county of Yellowstone and State of Montana, have invented certain new and useful Improvements in Safety Locking Attachments, of which the following is a specification.

This invention relates to a locking device for automobiles, designed primarily for use in connection with motor vehicles of the Ford type, but it is to be understood that the locking device can be employed for any purposes wherein it is found applicable, and the invention has for its object to provide, in the manner as hereinafter set forth, a locking device with means adapted to be locked to the steering wheel of a motor vehicle, for securely locking the spark and controlling levers from being shifted, under such conditions preventing their operation surreptitiously or by unauthorized persons to cause the driving of the car or vehicle.

Further objects of the invention are to provide a locking device for the purpose set forth, which is extremely simple in its construction and arrangements, strong, readily attached and removed from the steering wheel, compact, thoroughly efficient and convenient in its use, and comparatively inexpensive to manufacture.

With the foregoing and other objects in view, the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:—

Figure 1 is an elevation of a steering wheel, broken away, of a motor vehicle showing the adaptation therewith of a locking device in accordance with this invention, and Fig. 2 is an elevation of a locking device, and further showing in dotted lines, the clamping arm shifted to released position.

Referring to the drawings in detail, 1 denotes the rim of a steering wheel of the steering mechanism of a motor vehicle, 2 indicates the hub and 3 the arm of the spider of the wheel and which is formed integral with the rim 1, 4 the steering post, 5 the steering post column and 6 the steering gear quadrant.

The foregoing elements are of known construction and illustrated by way of example, so that the adaptation of the locking device in accordance with this invention can be shown in operative relation with respect to the spark and throttle controlling levers, 7 8, respectively.

A locking device in accordance with this invention comprises a body portion and a rim clamping lever, the latter being carried by the body portion, and each formed of suitable metallic materal of the desired rigidity and thickness, and the said body portion consists of an intermediate part 9 having an oval shaped opening 10 at one end thereof and near its other end is formed with a notch 11, in the top edge thereof. One side wall 12 of the notch is inclined upwardly and outwardly with respect to the other side wall 13 of said notch, and the said notch 11 is adapted to receive the throttle lever 8. The oval shaped slot or opening 10 at the other end of the intermediate part 9 is adapted to receive the spark controlling lever 7. That end of the part 9, of the body portion, having the notch 11, is formed with a longitudinally extending arm 14, which is offset with respect to the longitudinal plane of the part 9. The arm 14 is of a length as to project beyond the rim 1 and is termed the outer locking arm for said rim 1, and when the locking device is in operative position, the said arm 14, is disposed below the rim 1, as clearly shown in Fig. 1. Extending upwardly from the inner end of the arm 14, is a vertical extension 15, which has the inner edge thereof to form a continuation of the wall 13 of the notch 11. The extension 15, when the device is in locking position, is arranged inwardly with respect to the rim 1 and is termed, an inside locking post. Projecting upwardly from that end of the part 9, which is provided with the slot 10, is an upwardly extending inverted L-shaped supporting arm, with the legs thereof indicated at 16 and 17. The leg 16 is vertical and when the device is in locking position, is arranged inwardly with respect to the rim 1, and the leg 17 which extends horizontally, at right angles with respect to the leg 16, is positioned upon the upper face of the rim 1, as clearly shown in Fig. 1.

The rim clamping lever, which is pivoted to the body portion, consists of a curved shank 18, which terminates in an inverted yoke-shaped member 19, the latter having the outer leg 20 thereof, detachably connected as at 21 to the outer end of the arm 14. The inner leg 22 of the member 19 is inclined downwardly and inwardly with respect to the leg 20, and associates with the post 15, to overlap the inner side of the rim 1, when the locking device is in locking position, as shown in Fig. 1. The shank 18, of the rim clamping lever, is pivotally connected as at 23, to the part 9, at a point between the slot 10 and the notch 11, but in closer proximity to the notch 11 than with respect to the slot 10.

The arm 14 at its free end is formed with an opening 24, and the lower end of the leg 20 is provided with an opening 25, and when the device is in locking position, the openings 24 and 25 register, for the passage of the hasp 26 of the locked body 27. See Fig. 1.

When the locking device is set up, the body portion thereof is positioned forwardly with respect to the steering post 4, and is so shifted to provide for the passage through the body portion, of the spark controlling lever 7, the latter passing through the slot 10. Prior to the positioning of the body portion in the manner as stated, the lock body 27 is detached, so that the pivoted clamping arm can be swung upwardly in the position as shown in dotted lines in Fig. 2, so that the arm 14 can be positioned below the rim 1. When the arm 14 is positioned below the rim 1, the throttle controlling lever 8 is mounted in the notch 11, then the clamping lever is swung over the lever 8 and the rim 1, and the leg 20 and arm 14 secured together through means of the lock body 27. When the device is in the position as shown in Fig. 1, the shifting of the controlling levers will be arrested as is obvious. When the device is not in use, it can be conveniently stored within the automobile body, owing to the fact that the locking device is not very large and is of such size, that it can be placed at any desired point.

What we claim is:—

1. A locking device for the purpose set forth, comprising a body portion having an intermediate part thereof formed with a notch near one end for the passage of a throttle controlling lever and a slot near its other end for the passage of a spark controlling lever, an inverted L-shaped supporting arm projecting from one end of said intermediate part, a locking arm extending from the other end of said intermediate part, and a clamping lever pivoted to said intermediate part and provided with an inverted yoke-shaped member associated with and adapted to be secured to said locking arm.

2. A locking device for the purpose set forth, comprising a body portion provided at one end with a supporting arm and at its other with rim clamping means, said body portion further provided with a notch for the passage of a throttle controlling lever and further provided with a slot for the passage of a spark controlling lever.

3. A locking device for the purpose set forth, comprising a body portion provided with means for the reception of a throttle controlling lever and a spark controlling lever, a supporting arm at one end of said body portion, and a clamping lever pivoted to the body portion and associating with the other end thereof and adapted to be locked thereto for securing the body portion to the rim of a wheel.

4. A locking device for the purpose set forth, comprising a body portion provided with means for the reception of a throttle controlling lever and a spark controlling lever, a supporting arm at one end of said body portion, and a clamping lever pivoted to the body portion and associating with the other end thereof and adapted to be locked thereto for securing the body portion to the rim of a wheel, said clamping lever associating with said body portion to maintain said throttle lever therein.

5. A locking device for the purpose set forth, comprising a body portion provided with a slot for the passage of a spark controlling lever of a motor vehicle, said body portion further having a notch for the reception of the throttle controlling lever of an automobile, a supporting arm at one end of said body portion, a locking arm at the other end of said body portion, a clamping lever pivotally connected to the said body portion and provided with an inverted yoke-shaped member associated with said locking arm, means for detachably securing said member and locking arm together, said locking member and locking arm providing means for connecting said body portion to the rim of a steering wheel, and said lever associating with the body portion for maintaining said throttle lever therein.

6. A locking device for the purpose set forth, comprising a body portion having means for supporting it at one end from the steering wheel of a motor vehicle and adapted to receive the throttle and spark controlling levers of a motor vehicle, said body portion provided at one end with a locking arm, and clamping means carried by the body portion, adapted to be secured to said arm for connecting the body portion to the rim of a wheel, said clamping means maintaining the throttle controlling lever within said body portion.

7. A locking device for the purpose set forth, comprising a body portion having means for supporting it at one end from the steering wheel of a motor vehicle and further provided with means for the reception of the throttle and spark controlling levers of a motor vehicle, said body portion further provided at one end with a locking arm, and a clamping means pivotally connected to the body portion and adapted to be secured to said arm for connecting the body portion to the rim of a wheel, said clamping means including a shank for maintaining the throttle controlling lever within said body portion.

8. A locking device for the purpose set forth, comprising a body portion having means for supporting it at one end from the steering wheel of a motor vehicle and further provided with means for the reception of the throttle and spark controlling levers of a motor vehicle, said body portion further provided at one end with a locking arm, and a clamping means pivotally connected to the body portion and adapted to be secured to said arm for connecting the body portion to the rim of a wheel, said clamping means including a shank for maintaining the throttle controlling lever within said body portion, and said locking arm offset with respect to said body portion.

9. A locking device for the purpose set forth, comprising a body portion having means for supporting it at one end from the steering wheel of a motor vehicle and further provided with means for the reception of the throttle and spark controlling levers of a motor vehicle, said body portion provided at one end, opposite the end formed with the supporting means, with a vertically disposed post and a longitudinally extending locking arm, and clamping means pivotally connected to the body portion, bearing against said post, adapted to be secured to said locking arm, and connecting said body portion to the rim of a steering wheel, said clamping means further including a shank for maintaining the throttle controlling lever within the body portion.

10. A locking device for the purpose set forth, comprising a body portion having means for supporting it at one end from the steering wheel of a motor vehicle and further provided with means for the reception of the throttle and spark controlling levers of a motor vehicle, said body portion provided at one end, opposite the end formed with the supporting means, with a vertically disposed post and a longitudinally extending locking arm, and clamping means pivotally connected to the body portion, bearing against said post, adapted to be secured to said locking arm, and connecting said body portion to the rim of a steering wheel, said clamping means further including a shank for maintaining the throttle controlling lever within the body portion, and said locking arm offset with respect to said body portion.

In testimony whereof, we affix our signatures.

JUSTIN M. SMITH.
EARNEST SCHANKS.